Oct. 4, 1966
E. M. TAFT
3,276,265
EFFLUENT SPLITTER
Filed Nov. 23, 1964
2 Sheets-Sheet 1
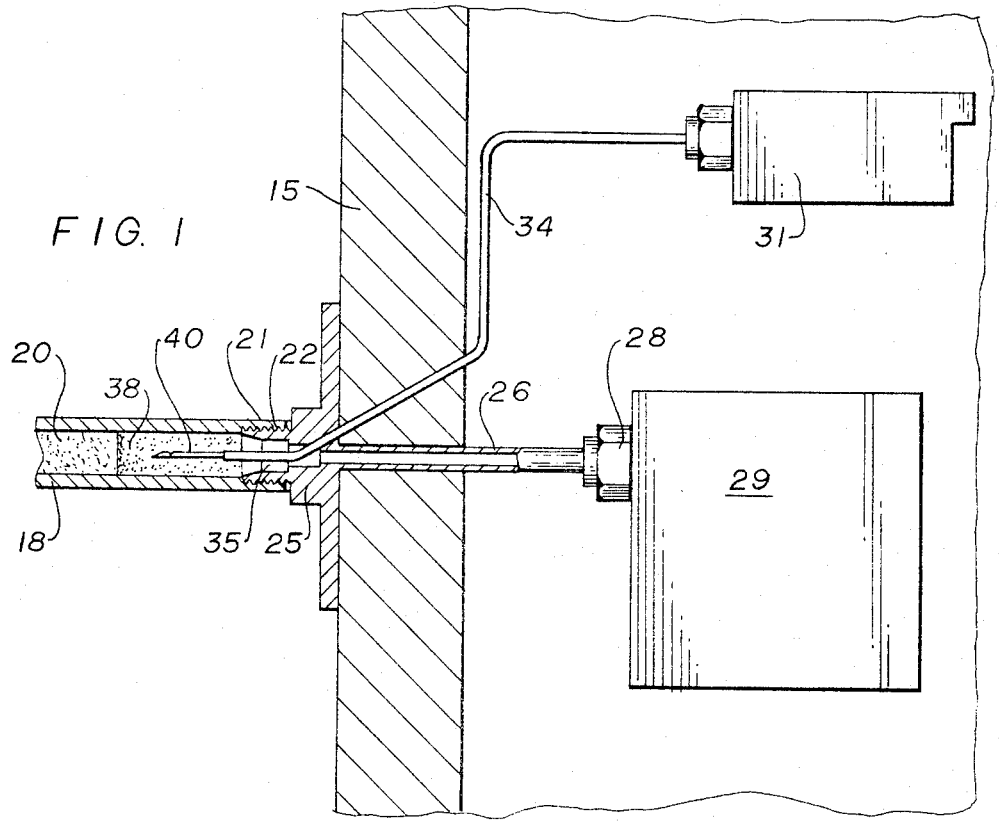
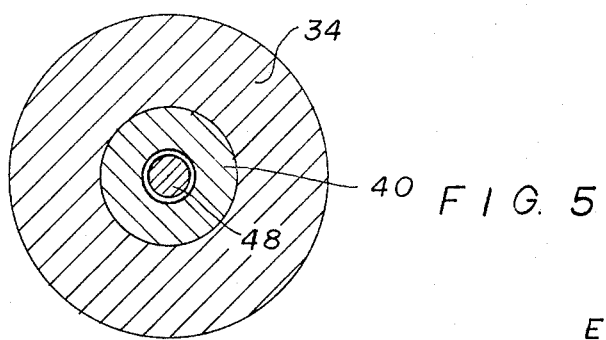
INVENTOR.
EARL M. TAFT
BY
Townsend and Townsend
ATTORNEYS FIG. 2
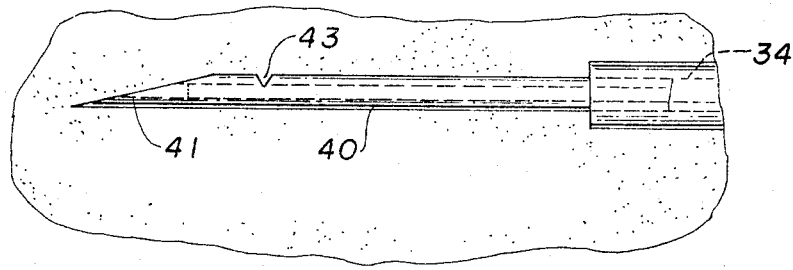
FIG. 3
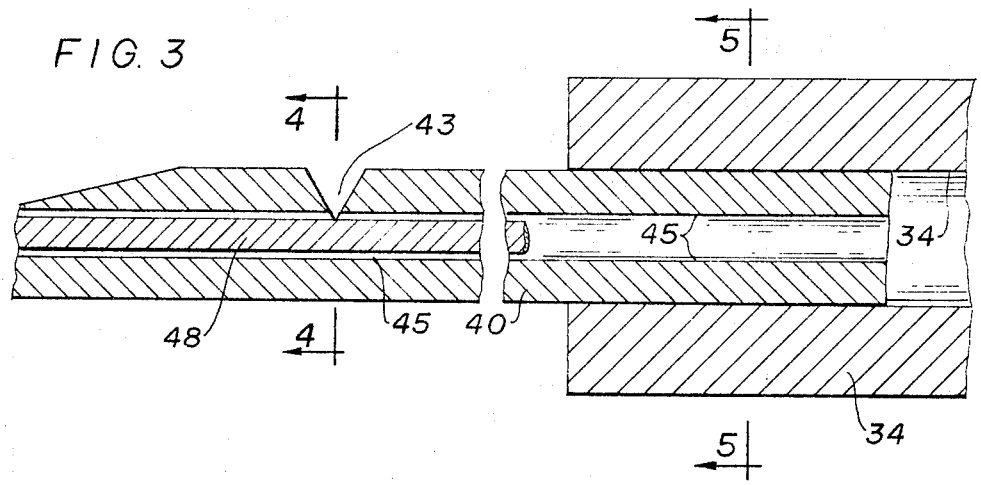
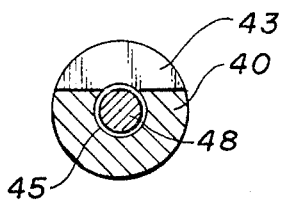
FIG. 4
INVENTOR.
EARLE M. TAFT
BY
Townsend and Townsend
ATTORNEYS pt Office 3,276,265
Patented Oct. 4, 1966

3,276,265
EFFLUENT SPLITTER
Earl M. Taft, Lafayette, Calif., assignor to Wilkins Instrument & Research, Inc., Walnut Creek, Calif.
Filed Nov. 23, 1964, Ser. No. 413,163
5 Claims. (Cl. 73—422)

This invention relates to an apparatus for separating effluent gas from a column in gas chromatography.

In gas chromatography minute quantities of test gas are passed in a carrier gas through a packed column which will cause the chemical constituents of the gases to be separated out at various intervals for detection. In many applications it is desirable to divide the effluent gas from the column into two or more sections. Such division facilitates simultaneous readings by detectors having different inherent characteristics and also provides means whereby a small quantity of the output gas can be detected to qualitatively analyze the gas while the larger stream is flowed to a collector under control of the information realized from the detector. The latter technique is particularly useful when the detector must of necessity destroy the sample as do all presently used highly sensitive detectors. It is, therefore, impossible to run the same sample through the detector if it is to be collected in the pure form. In technique currently employed it is necessary to simultaneously separate the gas into a major and minor line or tube with the reading of the detector being proportional to what the reading would be in the major tube were a detector to be used in the major tube. Thus, it is desired that the detected gas be the identical twin of the gas being collected. Gas splitting apparatus previously used comprises a basic T-shaped tubing in which one leg of the "T" offered greater impedance to fluid flow than the other leg, thus hopefully rendering the greater amount of the sample gas to the line having the lower impedance and the lesser amount to the detecting system. This system, however, often provided errors due to the fact that the heavier molecules tend to be diverted to the low impedance tube in greater percentage than the carrier gas. Therefore, in some cases the detector would not see its proportionate share of test gas.

In the present invention the effluent is separated in its two outlets while the effluent is still within the packing of the column and is still in a liquid phase, thus eliminating diversion of a disproportionate amount of the heavy molecular materials to the lower impedance path.

It is the object of this invention to provide a fluid stream splitter having a coaxially aligned pick-up disposed within the packing of the column in such a way as to collect the gas within the column in an area where gas is still in association with the packing.

These and other objects and advantages of the invention will be apparent upon reading the detailed description in conjunction with the drawings in which:

FIG. 1 is a cross-sectional view showing the end of a column with the splitter affixed thereto and with the two tubes leading therefrom going to the respective outputs.

FIG. 2 is a side view of the collecting tube.

FIG. 3 is an enlarged cross-sectional view of the collecting tube.

FIG. 4 is a cross-sectional view of the tube taken at line 4—4 of FIG. 3; and

FIG. 5 is a cross-sectional view of the tube taken at line 5—5.

In FIG. 1 there is provided a wall 15 of a furnace in which a conventional column 18 is situated. The column may be any form of a conventionally packed column used in gas chromatography. Conventionally, such columns are filled with chromasorb, diatomaceous earth and other materials to form the packing 20. The test fluid in a carrier gas is flowed into the column where it is released in phases related to the particular test materials. The phase relationship of the test material emitted is an induction of the identity of the material.

End 21 of the column is mounted by a conventional fitting 22 to an outlet fitting 25 which is attached via a tube 26 to an input fitting 28 of basic collector 29. The collector conventionally comprises a plurality of collecting vials into which the gases are either condensed out or maintained in a gaseous condition depending on the materials and temperatures. Collector 29 is also conventionally arranged to register the vials with the gas input in synchronization with control signal from a detector 31 which is arranged to receive samples of the gas simultaneously with the entry of the gas into the collector.

Detector 31 is arranged to detect and register the presence of test gas in phase relation identical to the input to the collector. Detector 31 may be any detector and preferably is a detector which will test the presence of extremely minute quantities of materials; such detectors, for example, commonly known as hydrogen flame ionization, electron mobility, electron capture and the like are suitable. The input to detector 31 is derived through tube 34 which enters through furnace wall 15 and into fitting 25. The input terminus of tube 34 is coaxially aligned within column 18 and embedded in packing 20. The opening to tube 34 is restricted to a substantially smaller opening than opening 35 to tube 26 which provides the gas flow to collector 29. Ratios of 25:1 or possibly even greater of gas flow to the detector and collector by this device can be maintained. The greater parts of each volume of gas are available for collection and smaller parts are utilized for detection. Exit end 38 of column 18 can be formed with a packing employed in the remaining body of the column; however, it has been found that materials having a large surface area but with physical characteristics which will avoid the clogging of the entry port to tube 34 are more desirable. Such materials as diatomaceous earth, firebrick, glass-wool, sand treated with hydrochloric acid, and other such materials have been found to work satisfactorily in this respect.

The entry port for tube 34 leading to detector 31 is formed by a hypodermic type needle 40 the tip portion 41 of which is tapered in order to obtain easy insertion into the packing material. An entry wedge 43 is formed slightly rearwardly of the point of the needle and opens to the needle bore, of course, is connected to open to tube 34. A length of wire 48 is inserted into the entry bore 45 of needle 40 to restrict the entry opening. It has been found in practice that a 21 gauge needle having an inside diameter of .018 inch can be restricted with wire 48 having an outside diameter of as small as .016 inch. In this case clearance around the wire of .001 inch can be obtained. The wedge or notch 43 is displaced from the entry tip so that upon insertion into the packing head area 38 there will be little chance of the packing particles clogging the opening.

Wire 48 is removable to effect a means for changing the splitter ratios. The selection of the appropriate wire will govern the ratio between the flow to the collector 29 and the detector.

It is good practice to prepare the packing by first inserting a blank needle into the packing prior to inserting needle 40. This will lessen the possibilities of the packing clogging the needle. In operation of the invention the gas is flowed within the packing over the large surface areas formed by the packing in the area where it is transferred to needle 40. Because of this fact condensation is avoided and the heavier molecules will flow into tube 45 in the same proportion as the lighter molecules, thus insuring a proportional distribution of gas regardless of the molecular weights of the materials. It can thus be seen that the desired ratio of gas to the detector 31 and the collector 29 can be maintained. The ratio can easily be varied by changing the size of wire 48. This can simply be accomplished by removing the column 18 from fitting 25 and replacing the wire with a new wire and then re-connecting the column to the fitting.

While collector 29 has been described as a mechanism for collecting gas a second detector can also be utilized to establish simultaneous detector by two types of detectors. For example, detector 31 can be of the flame ionization type and an electron capture type of detector can be inserted at the output end of tube 26. In this event both readings of the two detectors could be compared to establish a relationship of simultaneous readings with different types of detecting apparatus.

While one embodiment of this invention has been shown and described, it will be apparent that other adaptations and modifications can be made without departing from the true spirit and scope of the invention.

What is claimed is:

1. In combination with a gas chromatography column having an input and an output end of a packing material disposed within the column between the two ends, an opening at the output end of said column, a conduit connected to said opening for fluid connection to a first output station, a second conduit entering said opening and connected for fluid connection to a second output station, a needle having an outside diameter substantially smaller than the opening at the output of said column mounted on the end of said second conduit and projecting into said packing, a canal formed in said needle opening to said packing and to said second conduit.

2. In combination with a gas chromatography column having an input and an output end of a packing material disposed within the column between the two ends, an opening at the output end of said column, a conduit connected to said opening for fluid connection to a first output station, a second conduit entering said opening and connected for fluid connection to a second output station, a needle having an outside diameter substantially smaller than the opening at the output of said column mounted on the end of said second conduit and projecting into said packing, and a canal formed in said needle opening to said packing and to said second conduit, the packing immediately adjacent said needle being of sufficiently coarse grain to prevent the packing from clogging the canal of said needle.

3. In combination with a gas chromatography column having an input and an output end of a packing material disposed within the column between the two ends, an opening at the output end of said column, a conduit connected to said opening for fluid connection to a first output station, a second conduit entering said opening and connected for fluid connection to a second output station, a needle having an outside diameter substantially smaller than the opening at the output of said column mounted on the end of said second conduit and projecting into said packing, a canal formed in said needle opening to said packing and to said second conduit, and a wire mounted within the canal of said needle, said wire having an outer diameter of sufficiently less diameter than the bore of said canal to provide a fluid flow path of predetermined capacity in the area between said wire and the bore of the canal of said needle.

4. In combination with a gas chromography column including a packing material, an opening at the end of said column, a tube connected to said opening for fluid connection to a first output station, a second tube entering said opening and connected for fluid connection to a second output station, a needle mounted on said second conduit and projecting into said packing, a canal formed in said needle opening to said second conduit on one end and opening at the opposite end within said packing and a notch formed in the side wall of said needle and positioned within said packing, said notch opening to the canal of said needle.

5. In combination with a gas chromatography column including a packing material, an opening at the end of said column, a tube connected to said opening for fluid connection to a first output station, a second tube entering said opening and connected for fluid connection to a second output station, a needle mounted on said second conduit and projecting into said packing, a canal formed in said needle opening to said second conduit on one end and opening at the opposite end within said packing, a notch formed in the side wall of said needle and positioned within said packing, said notch opening to the canal of said needle, and said packing being formed of a material of sufficient consistency to prevent the packing from clogging said needle and having sufficient surface area to maintain the gaseous material in association therewith in a gaseous state.

References Cited by the Examiner

UNITED STATES PATENTS

| | | | |
|---|---|---|---|
| 3,103,807 | 9/1963 | Broerman | 73—23.1 |
| 3,124,952 | 3/1964 | Johnson | 73—23.1 |

LOUIS R. PRINCE, *Primary Examiner.*

S. C. SWISHER, *Assistant Examiner.*